(12) United States Patent
Okonkwo et al.

(10) Patent No.: US 9,213,125 B2
(45) Date of Patent: Dec. 15, 2015

(54) WELL LOGGING APPARATUS AND SYSTEM

(71) Applicants: China National Petroleum Corporation, Beijing (CN); Oliden Technology, LLC, Sugar Land, TX (US)

(72) Inventors: Chidiebele Gabriel Okonkwo, Houston, TX (US); Qiming Li, Sugar Land, TX (US); Anzong Li, Shaanx (CN); Chuanwei Li, Shaanx (CN); Jun Zhu, Shaanxi (CN)

(73) Assignees: Oliden Technology, LLC, Sugar Land, TX (US); China National Petroleum Corporation, Beijing (CN)

( * ) Notice: Subject to any disclaimer, the term of this patent is extended or adjusted under 35 U.S.C. 154(b) by 448 days.

(21) Appl. No.: 13/849,332

(22) Filed: Mar. 22, 2013

(65) Prior Publication Data

US 2014/0285205 A1     Sep. 25, 2014

(51) Int. Cl.
*G01V 3/10*      (2006.01)
*G01V 13/00*     (2006.01)
*G01V 3/28*      (2006.01)
*E21B 47/01*     (2012.01)
*G01V 3/30*      (2006.01)

(52) U.S. Cl.
CPC ............... *G01V 13/00* (2013.01); *E21B 47/011* (2013.01); *G01V 3/28* (2013.01); *G01V 3/30* (2013.01); *Y10T 29/49826* (2015.01)

(58) Field of Classification Search
CPC ........................................................ G01V 3/10
USPC ................. 324/333, 338, 346, 351, 366–369
See application file for complete search history.

(56) References Cited

U.S. PATENT DOCUMENTS

| | | | |
|---|---|---|---|
| 4,570,123 A * | 2/1986 | Grosso | 324/369 |
| 4,575,681 A * | 3/1986 | Grosso et al. | 324/347 |
| 4,618,828 A * | 10/1986 | Raynal | 324/347 |
| 4,692,908 A * | 9/1987 | Ekstrom et al. | 367/27 |
| 4,949,045 A | 8/1990 | Clark et al. | |

(Continued)

FOREIGN PATENT DOCUMENTS

EP           0723067 A2      7/1996

OTHER PUBLICATIONS

Warren, "Casing Drilling With Retrievable Drilling Assemblies", Offshore Technology Conference, May 2004, p. 1-12.*

(Continued)

*Primary Examiner* — Patrick Assouad
*Assistant Examiner* — Lamarr Brown
(74) *Attorney, Agent, or Firm* — Patrick Steele; Bryan L. White (57) ABSTRACT

A system and apparatus for configuring a well logging assembly having an elongate sub with a bore therethrough, a leading end connection and a trailing end connection, a plurality of sets of recesses in an exterior wall of the sub to receive a plurality of sets of inserts, each having a threaded exterior surface, a plurality of internally threaded retainer rings, and a plurality of well logging devices securable to the exterior wall of the sub using the retainer rings to threadably engage the inserts received in the recesses. The system enables convenient configuration and reconfiguration of the well logging assembly by enabling convenient securing of a first well logging instrument to the sub at a variety of spacings from a second well logging instrument to provide a variety of depths of investigation into a geologic formation penetrated by a drill string containing the well logging assembly.

18 Claims, 7 Drawing Sheets

(56) References Cited

U.S. PATENT DOCUMENTS

| | | | |
|---|---|---|---|
| 5,233,304 A * | 8/1993 | Hubans | 324/323 |
| 5,235,285 A | 8/1993 | Clark et al. | |
| 5,260,662 A * | 11/1993 | Rorden | 324/339 |
| 5,339,036 A | 8/1994 | Clark et al. | |
| 5,339,037 A | 8/1994 | Bonner et al. | |
| 5,359,324 A | 10/1994 | Clark et al. | |
| 5,463,320 A | 10/1995 | Bonner et al. | |
| 5,563,512 A * | 10/1996 | Mumby | 324/339 |
| 6,100,696 A * | 8/2000 | Sinclair | 324/339 |
| 6,910,534 B2 * | 6/2005 | Linyaev et al. | 166/250.11 |
| 7,436,183 B2 * | 10/2008 | Clark | 324/338 |
| 7,525,315 B2 * | 4/2009 | Fredette et al. | 324/342 |
| 7,898,259 B2 * | 3/2011 | Hall et al. | 324/339 |
| 7,948,395 B2 * | 5/2011 | Hall et al. | 340/854.9 |
| 8,258,976 B2 * | 9/2012 | Price et al. | 340/854.4 |
| 8,508,231 B2 * | 8/2013 | Wang | 324/366 |
| 8,604,796 B2 * | 12/2013 | Wisler et al. | 324/346 |
| 2003/0184302 A1 * | 10/2003 | Omeragic et al. | 324/338 |
| 2004/0061622 A1 * | 4/2004 | Clark | 340/854.6 |
| 2008/0115575 A1 * | 5/2008 | Meek et al. | 73/152.24 |
| 2008/0284440 A1 * | 11/2008 | Moore | 324/333 |
| 2011/0074427 A1 * | 3/2011 | Wang et al. | 324/339 |
| 2011/0316542 A1 * | 12/2011 | Frey et al. | 324/339 |
| 2013/0134971 A1 * | 5/2013 | Blanz et al. | 324/303 |

OTHER PUBLICATIONS

Lopez et al. "Casing Drilling Application With Rotary Steerable and Triple Combo in New Deviated Wells in Cira Infantas Field", SPE Annual Technical Conference and Exhibition, Sep. 2010, p. 1-17.*

Shepard et al., "Casing Drilling: An Emerging Technology", SPE Drilling and Completion, Mar. 2002, p. 4-14.*

International Search Report and the Written Opinion of the International Searching Authority; (ISA) International Searching Authority; Jan. 30, 2015.

* cited by examiner

WELL LOGGING APPARATUS AND SYSTEM

BACKGROUND OF THE INVENTION

1. Field of the Invention

The present invention relates to an apparatus and system for logging wells as they are drilled into a targeted geologic formation. More specifically, the present invention relates to an apparatus and a system for configuring a well logging tool with devices that generate and detect electromagnetic, acoustic, and other physical signals.

2. Background of the Related Art

Well logging devices are lowered into a drilled earthen bore to detect conditions in a geologic formation penetrated by the bore. The detected conditions generally indicate the presence and/or absence of certain fluids that reside in the pores of the rock that makes up the geologic formation. Well logging devices include devices that generate signals aimed at a geologic formation adjacent to the bore and devices that detect those signals that are reflected by or returned from the geologic formation. Some well logging devices include a first well logging device to induce an electrical current to flow within the geologic formation of interest and a second well logging device to measure the resulting current flow in the formation to determine the electrical resistivity of materials residing within the formation. A high resistance to current flow generally indicates that a non-conductive fluid, such as oil or gas, resides in the pores of the formation while a low resistance to current flow generally indicates that a conductive fluid, such as water, resides in the pores of the formation.

In some applications, the spacing of a first, signal-generating well logging device on a well logging tool relative to a second, signal-detecting well device instrument on the well logging tool determines the depth of investigation; that is, the spacing between the first and second well logging devices determines the distance into the formation and from the bore in which the tool is disposed that is being investigated using the well logging devices. A greater the separation of the first well logging device from the second well logging device provides a greater distance into the geologic formation from the tool that is investigated, and a lesser separation of the first well logging device from the second well logging device provides a lesser distance into the formation from the tool that is investigated.

It is advantageous to investigate the properties of the formation at varying distances from the bore in order to better determine and account for changes in the formation occurring as a result of near-bore exposure to pressurized drilling fluids and to better determine a weighted-average property of the formation based on a plurality of detected conditions.

BRIEF SUMMARY OF THE INVENTION

The present invention provides a well logging apparatus and system for investigating the condition and/or content of a subsurface geologic formation penetrated by an earthen bore into which the well logging apparatus and system is introduced. The well logging apparatus and system can be configured with a plurality of well logging devices with a first well logging device disposed on the apparatus at a first spacing from a second well logging device. The well logging apparatus and system enables the repositioning of at least one well logging device to provide a reconfigured well logging apparatus with the first well logging device disposed on the reconfigured apparatus at a second spacing from a second well logging device. The ability to reconfigure the apparatus and to thereby vary the spacing of the well logging devices enables more thorough investigation of a geologic formation of interest using the apparatus and system.

One embodiment of the well logging apparatus and system comprises an elongate sub having a bore for fluid flow and a plurality of sets of recesses spaced along the external wall to enable the securing of well logging devices to the sub at varying spacings.

In one embodiment of the apparatus and system of the present invention, well logging devices securable to the sub include transceivers. A transceiver is an device comprising both a transmitter and a receiver which are combined and share common circuitry or a single housing. By contrast, a transmitter-receiver is a device comprising both a transmitter and a receiver which do not share common circuitry.

A transceiver may comprise a wire coil encased within a non-conductive protective material with conductive leads connecting the wire coil to a power source, such as a battery, and/or connecting the wire coil to an amplifier and a processor. A transceiver may be operated in a first mode as a transmitter by using electrical power from the power source to provide a current flow in the coil. The current flow excites the coil and produces an electromagnetic field around the coil that can be directed, by strategic configuration of the well logging instrument, into a geologic formation adjacent to an earthen bore in which the well logging apparatus is deployed. Alternately, a transceiver may be operated in a second mode as a receiver by using the processor to detect, record and/or condition signals generated by one or more other well logging devices operated as transmitters and flowing through and conditioned by the adjacent geologic formation to reach the receiver. It will be understood that the condition of the signals detected by the transceiver operating in the second mode reflects the nature and character of the components and materials of the geologic formation through which the signals flow from the source transceiver to the detecting transceiver.

In one embodiment of the apparatus and system, well logging devices are repositionable along the sub to increase or decrease the spacing of the well logging devices and to increase or decrease the depth of investigation into the geologic formation. Varying the spacing of the well logging devices and the depth of investigation into the formation enables a more thorough investigation of the formation and provides additional data relating to the nature and character of the geologic formation of interest. The apparatus and system of the present invention enable the repositioning, removal, installation and substitution of well logging devices with minimal time and effort at the surface. More importantly, the apparatus and system of the present invention enable the use of well logging devices having a very narrow radial profile to be slidably positioned along the sub and secured at desired positions.

DETAILED DESCRIPTION OF THE INVENTION

One embodiment of the present invention provides a sub adapted for being connected within a drill string to be used for drilling an earthen bore and for being configured with one or more signal-generating devices and one or more signal-detecting devices at a known spacing one relative to the other; that is, each signal-generating device is at a known spacing relative to each signal-detecting device that detects a signal generated by a signal-generating device. A signal-generating device is also known as a transmitter and a signal-detecting, device is also known as a receiver. A transceiver is a device that can be used to both generate a signal to be detected by another device and/or to detect a signal generated by another device.

In one embodiment, a first transceiver comprises a generally sleeve-shaped antennae case having a coil of conductive wire encased in a generally non-conductive material. In one embodiment, the coil can be in the form of a length of conductive wire winding around within, the antennae case, such as in transceivers used in induction or propagation-type resistivity logging tools or, in another embodiment, the coil can be in a toroid form wound around a ring of highly permeable magnetic material, such as in a lateral-type tool used for logging while drilling applications. Alternately, the coil can be in the form of a pre-formed printed circuit type used for producing field patterns.

The first transceiver has a bore that can be received onto a sub that is made up within a drill string used to extend an earthen bore. Electrically conductive leads extending from a first end and a second end of the coil are connected to a power source, such as a battery, to cause an electrical current to flow through the coil. The current flowing in the coil generates an electromagnetic field that penetrates an adjacent geologic formation as the drill string is used to extend the earthen bore into which the sub and well-logging instruments are deployed.

A second transceiver, also having a coil encased within a non-conductive material and leads connected at the first and second ends of the coil, is disposed on the sub at a known spacing relative to the first transceiver. The leads of the second transceiver are connected to a device that detects and analyzes signals received at the coil from the adjacent geologic formation and that originate from the first transceiver. The detected signals are altered by or conditioned by the components of the formation, and the detected signals can be used to determine the nature and character of the components of the formation that caused the alteration or conditioning of the signals. For example, a low-conductivity material, such as hydrocarbon gas or oil, stored in the pores of the geologic formation will affect the signal generated by the first transceiver and detected by the second transceiver in a first way, while a highly conductive material, such as water or brine, stored in the pores of the geologic formation will affect the signal generated by the first transceiver and detected by the second transceiver in another, very distinct way. The extent to which the signal generated by the first transceiver and detected at the second transceiver is altered or conditioned is an indicator of the nature and character of the material stored in the pores of the geologic formation of interest.

The spacing between the first transceiver used to generate a signal and a second transceiver used to detect the altered or conditioned signal returned by the formation provides an indication of the distance, from the tool and into the geologic formation, to which the altered or conditioned signal pertains. For example, but not by way of limitation, a first transceiver positioned on the tool at a distance of only 2 feet (61 cm) from the second transceiver will provide a detected signal that indicates the conditions in the geologic formation at a first distance from the tool, while a first transceiver positioned on the tool at a distance of 10 feet (305 cm) from the second transceiver will provide a detected signal that indicates the conditions in the geologic formation at a second distance from the tool that is substantially greater than the first distance. Varying the spacing between the first transceiver and the second transceiver is a method that provides a better and more detailed investigation of the components of the geologic formation both proximal to the drilled bore in which the tool resides and distal to the drilled bore.

The apparatus and system of the present invention provide a convenient solution to the need for varying the spacing of well logging devices of a configured well logging tool. The apparatus and system of the present invention enable a sub to be configured with a variety of spacings between the one or more well logging devices secured on a sub and used to generate and transmit a signal into an adjacent geologic formation of interest and to receive and detect altered or conditioned signals returning from the geologic formation of interest. In one embodiment, the sub used in the method, apparatus and system of the present invention comprises a bore through the sub and an exterior wall having a plurality of sets of recesses spaced along the length of the sub for use in securing well logging devices intermediate adjacent sets of recesses. A plurality of curved inserts are receivable into the recesses of the sub to provide threads to engage internally threaded retainer rings to secure a well logging device in a desired position on the sub. The threads of the curved inserts and the corresponding threads on the interior bore of the retainer rings are directed (e.g., left-handed or right-handed) to be tightened by interaction between the retainer ring and the wall of the earthen bore drilled or extended using the drill string into which the well logging tool is made up. Using the method, apparatus and system of the present invention, a well logging assembly of a drill string can be conveniently configurable and re-configurable because the well logging devices (transceivers, transmitters, receivers, etc.) of which the well logging assembly is comprised can be secured to the sub to provide a well logging assembly having a first configuration, used to investigate a formation of interest, and then later easily unsecured and removed from the first position location and repositioned to a different, second position on the sub. The well logging devices are then re-secured to the sub to provide a well logging assembly having a second configuration. The configurations can be predetermined prior to the execution of a drilling phase, for example, based on known or suspected formation properties, desirable detection range(s), and economic considerations such as cost.

Figure 1:
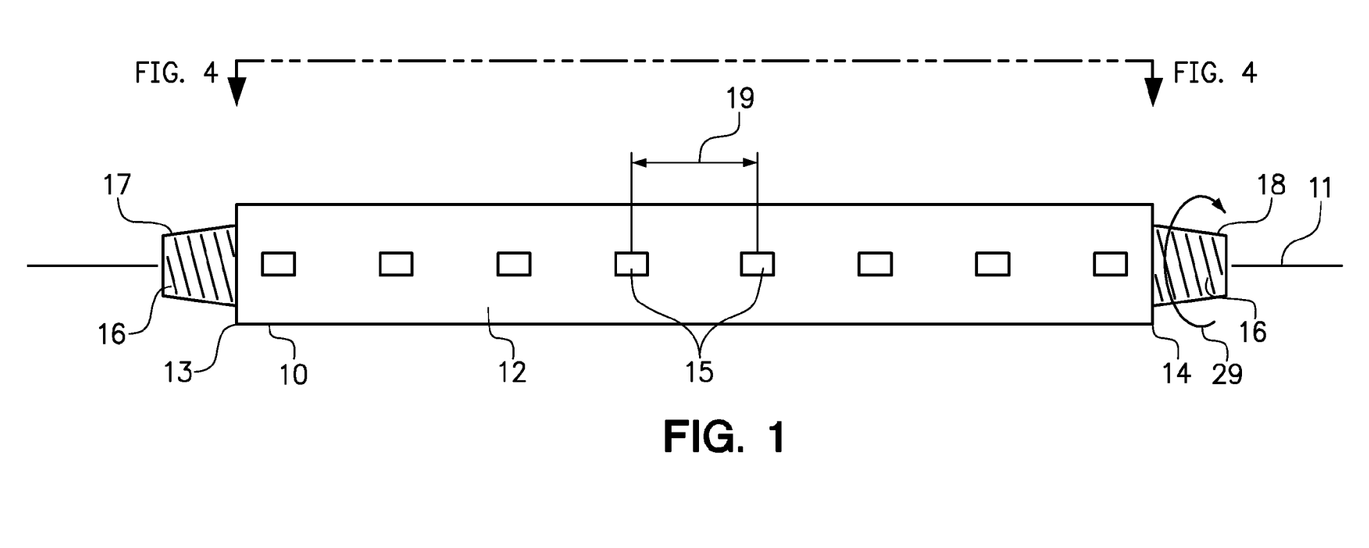
FIG. 1 is an elevation view of an elongate sub with an exterior wall and a plurality of sets of recesses axially spaced along an axis of the sub.

FIG. 1 is an elevation view of an elongate sub 10 with an exterior wall 12 and a plurality of sets of recesses 15 axially spaced along an axis 11 of the sub 10. The sets of recesses 15 may comprise two, three or more recesses 15 angularly distributed about the axis 11 of the sub 10. The embodiment of the sub 10 in FIG. 1 has a plurality of sets of recesses 15 comprising a plurality of pairs of recesses 15, each recess 15 of a set being 180 degrees out of phase about the sub 10 with the other recess 15 of the same pair (or set). It will be understood that, for a system of the present invention having a sub 10 with sets of recesses 15 comprising three recesses 15 in each set, each recess 15 will be 120 degrees out of phase about the sub 10 with each of the remaining two of the recesses 15 of the set, and that for a sub 10 having sets of recesses 15 comprising four recesses 15 in each set, each recess 15 will be 90 degrees out of phase with two of the remaining three of the recesses 15 in the set, etc. It will be further understood that other embodiments of the system of the present invention may have recesses 15 of a set that are not equi-angularly distributed about the axis 11 of the sub 10, but an equi-angular distribution of the recesses 15 within a set provides for optimal torqueing and retention of retainer rings 30 (not shown in FIG. 1) that are to be received on, and secured to, the sub 10 by inserts 20 (not shown in FIG. 1) received in the recesses 15.

The embodiment of the sub 10 in FIG. 1 further comprises a leading end 13 and a trailing end 14, a leading end connection 17 at the leading end 13 and a trailing end connection 18 at the trailing end 14. The leading end connection 17 and the trailing end connection 18 of the sub 10 enable the connection of the sub 10 into a drill string (not shown) having, for example, a drilling assembly (not shown), including devices such as a drill bit, connected to the leading end connection 17 and a rotary-powered top drive drilling rig (not shown) connected to the trailing end connection 18. The threads 16 on the leading end connection 17 and the trailing end connection 18 of the sub 10 are right-handed threads. Torque applied to the drill string (not shown) by the drilling rig (not shown) in the direction of arrow 29 tends to tighten the threaded connection between the drilling assembly (not shown) and the leading end connection 17 and also to tighten the threaded connection between the drilling rig (not shown) and the trailing end connection 18, and all threaded connections therebetween.

The sets of recesses 15 of the embodiment of the sub 10 illustrated in FIG. 1 are equidistant one from the others and have a uniform separation distance 19 between adjacent sets of recesses 15. It will be understood that other embodiments may comprise irregularly or staggered separations between adjacent sets of recesses 15, or a combination of regular and irregular separations.

Figure 2:
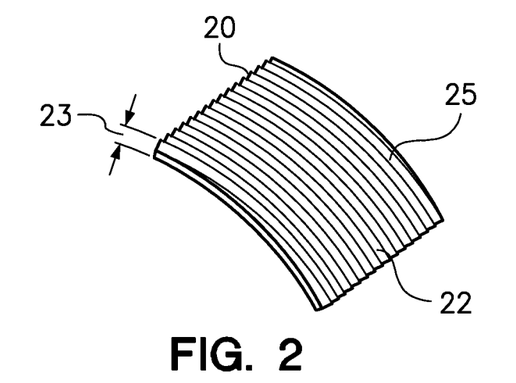
FIG. 2 is a perspective view of a threaded exterior surface of an insert receivable into a recess on the sub.
Figure 3:
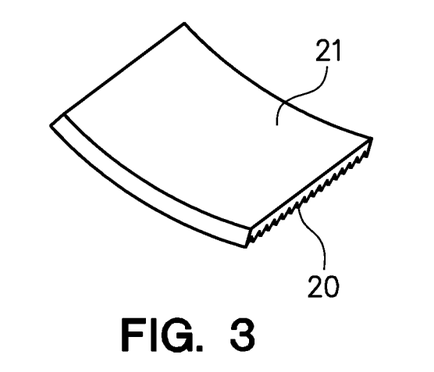
FIG. 3 is a perspective view of an interior surface of an insert conforming to the exterior wall of the sub within a recess.

FIG. 2 is a perspective view of a threaded exterior surface 22 of a curved insert 20 receivable into a recess 15 (not shown on FIG. 2—see FIG. 1) on the exterior wall 12 of the sub 10. The insert 20 has a thickness 23 (not including the height of the threads) that generally corresponds to a depth (not shown) of a recess 15 on the sub 10. The exterior surface 22 comprises a plurality of screw threads 25 that extend beyond the thickness 23 of the insert 20. FIG. 3 is a perspective view of an interior surface 21 of an insert 20 conforming to the exterior wall 12 of the sub 10 (not shown in FIG. 3—see FIG. 1) and within a recess 15.

Figure 4:
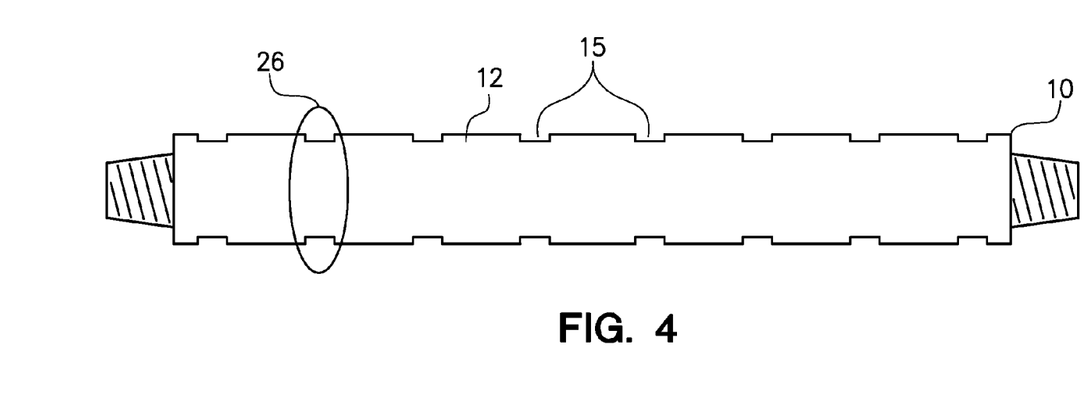
FIG. 4 is a plan view of the sub of FIG. 1.

FIG. 4 is a plan view of the sub 10 of FIGS. 1 and 2 illustrating the positions of the sets 26 of recesses 15 along the exterior wall 12 of the sub 10 of FIG. 1. FIG. 4 shows a set 26 of recesses 15 which, in the embodiment of the sub 10 in FIG. 4, comprises two recesses 15 per set 26.

Figure 5:
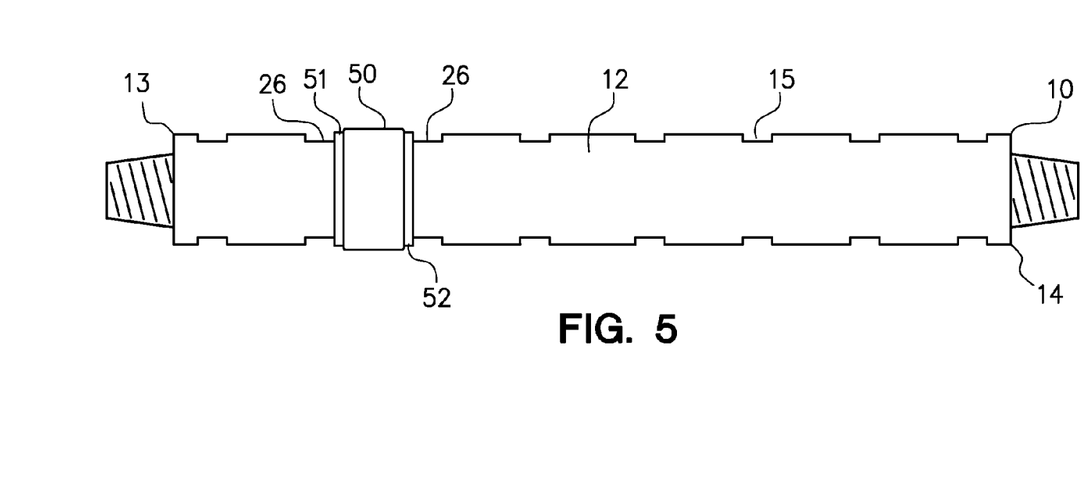
FIG. 5 is the plan view of FIG. 4 after an electromagnetic well logging device is received onto the sub to a first position.

FIG. 5 is the plan view of FIG. 4 after a first, sleeve-shaped well logging device 50, which may be, for example, a transceiver, is slidably received onto the sub 10 to a first position intermediate two adjacent sets 26 of recesses 15 to enable the well logging device 50 to be secured to the sub 10. The well logging device 50 in the embodiment of the system illustrated in FIG. 5 is generally sleeve-shaped to enable the well logging device 50 to be received over either the leading end 13 or the trailing end 14 of the sub 10 and to slide along the sub 10 to the first position illustrated in FIG. 5. It will be understood that there are no radially protruding obstacles along the exterior wall 12 of the sub 10 preventing sliding movement of the well logging device 50 or other devices along the exterior wall 12 of the sub 10. The well logging device 50 in FIG. 5 has a first shoulder 51 proximal a set 26 of recesses 15 and a second shoulder 52 disposed proximal an adjacent set 26 of recesses 15. It will be understood that other embodiments of the system of the present invention may comprise a well logging device 50 that may be longer, in an axial direction, and that the sets 26 of recesses 15 that straddle the well logging device 50 may not always be immediately adjacent one to the other, and that such a well logging device 50 may conceal one or more sets 26 of recesses 15 in the exterior wall 12 of the sub 10.

Figure 6:
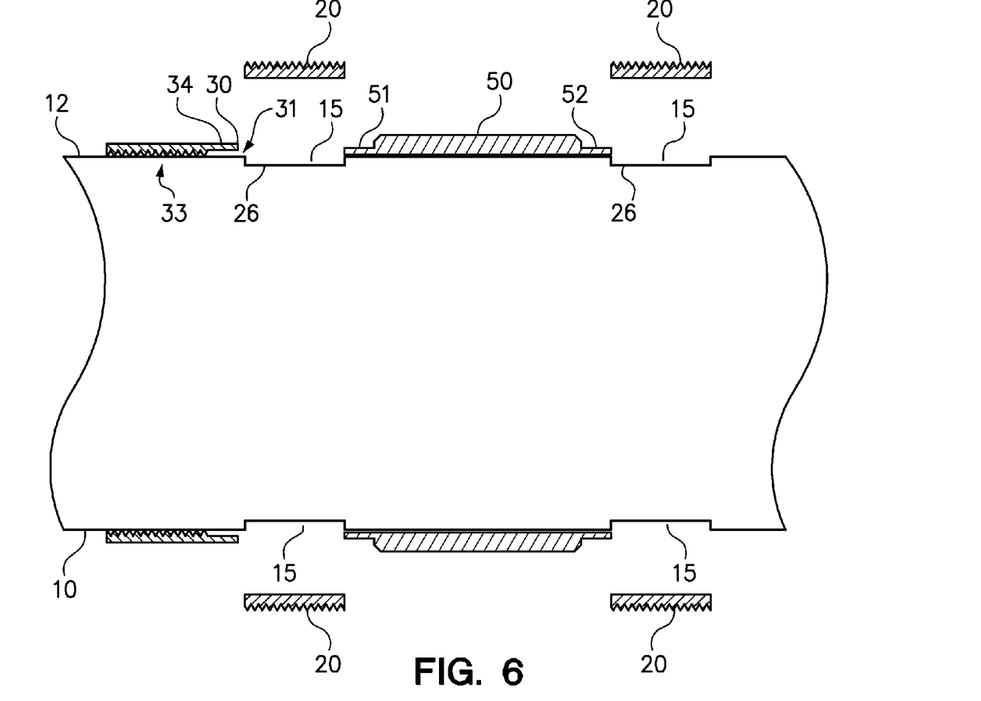
FIG. 6 is an enlarged view of a portion of the sub of FIG. 5 with a set of inserts aligned with a set of recesses of the sub proximal to a first end of the well logging device.

FIG. 6 is an enlarged view of a portion of the sub 10 of FIG. 5 with the well logging device 50 positioned intermediate the immediately adjacent sets 26 of recesses 15. The well logging device 50, the inserts 20 and a retainer ring 30 are shown in FIG. 6 in cross-section. An insert 20 is shown aligned with each of the four recesses 15 on the exterior wall 12 of the portion of the sub 10, with two inserts 20 aligned with recesses 15 of the set 26 proximal to the first shoulder 51 of the well logging device 50 and two inserts 20 aligned with recesses 15 of the set 26 proximal to the second shoulder 52 of the well logging device 50. A retainer ring 30 having an internally threaded portion 33 and an adjacent enlarged bore portion 31 is received onto the portion of the sub 10 proximal to the set 26 of recesses 15 proximal to the first shoulder 51. The enlarged bore portion 31 of the retainer ring 30 is within a sleeve portion 34 of the retainer ring 30.

Figure 7:
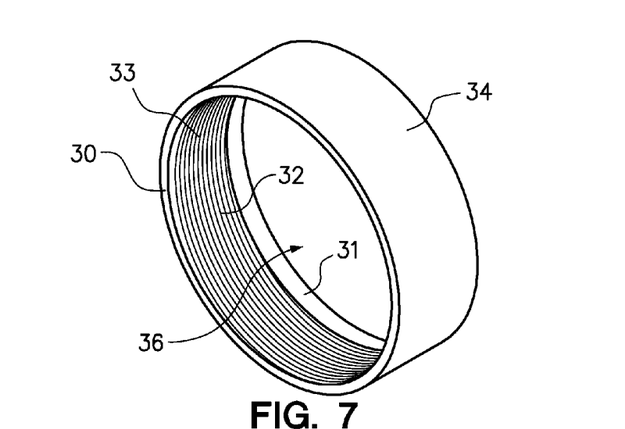
FIG. 7 is a perspective view of a retainer ring having an internally threaded portion to engage the threaded exterior surface of inserts received in a set of recesses on the sub.

FIG. 7 is a perspective view of the retainer ring 30 of FIG. 6 illustrating the bore 36 of the retainer ring 30 sized to receive the sub 10 (not shown—see FIG. 6), the internally threaded portion 33 having a plurality of threads 32 and the sleeve portion 34 having an enlarged bore portion 31.

Figure 8:
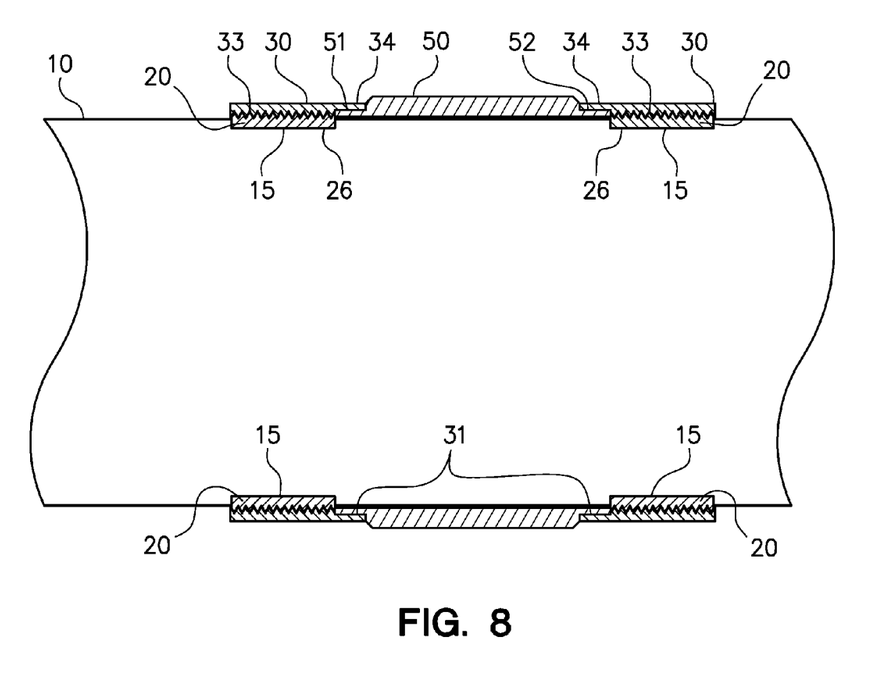
FIG. 8 is the view of the portion of the sub of FIG. 6 after the sets of inserts are received into the corresponding sets of recesses and internally threaded retainer rings are threaded onto the threaded exterior surfaces of each of the set of inserts.

FIG. 8 is the view of the portion of the sub 10 of FIG. 7 after the inserts 20 are received into the aligned recesses 15 and after the internally threaded portion 33 of the retainer ring 30 is threaded onto the adjacent inserts 20 to dispose the enlarged bore portion 31 within the sleeve portion 34 of the retainer ring 30 into engagement with the first shoulder 51 of the well logging device 50. A second retainer ring 30 is similarly introduced onto the sub 10 and similarly engaged with the second shoulder 52 of the well logging device 50. The retainer rings 30 together secure the first shoulder 51 and the second shoulder 52 of the well logging device 50 to secure the well logging device 50 in the first position illustrated in FIG. 7 and intermediate the adjacent sets 26 of recesses 15 on the sub 10.

Figure 9:
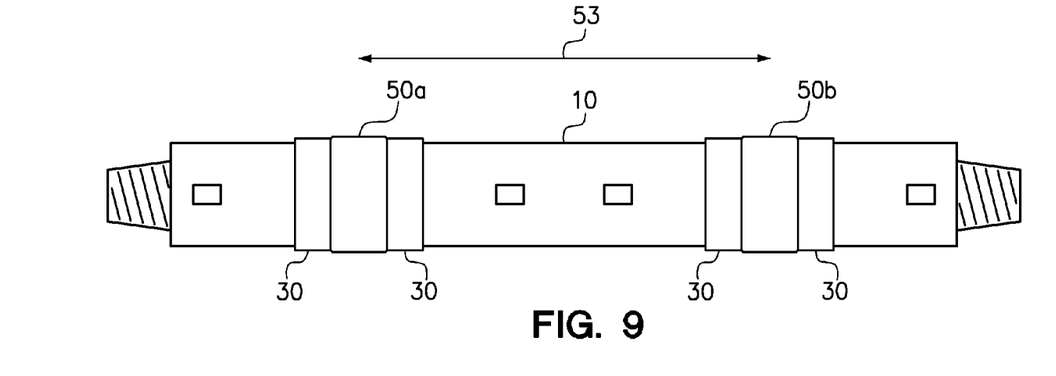
FIG. 9 is the elevation view of the sub of FIG. 1 after a first well logging device and a second well logging device are secured to the sub to provide a first spacing between the first and second well logging devices.

FIG. 9 is the view of the sub 10 of FIG. 1 after a first well logging device 50a and a second well logging device 50b are secured on the sub 10 in the manner illustrated in FIGS. 1-8 to provide a first spacing 53 between the first well logging device 50a and the second well logging device 50b. The first spacing 53 illustrated by the separation of the first well logging device 50a and a second well logging device 50b results in a capacity to investigate a geologic formation at a corresponding first depth or distance from the axis 11 (not shown in FIG. 9—see FIG. 1) of the sub 10. It will be understood that the first depth or distance from the axis 11 and into the formation of the investigation performed using well logging devices 50a and 50b at a given spacing 53 is not necessarily equal to the spacing 53, but is greatly influenced by the well spacing 53. Other factors that may affect the actual depth or distance from the axis 11 and into the formation may include, for example, the size, conductivity and the number of windings within the coil (not shown) in the well logging devices 50a and 50b, the nature and character of the components of the formation (not shown), and the current level delivered to the coil.

Figure 10:
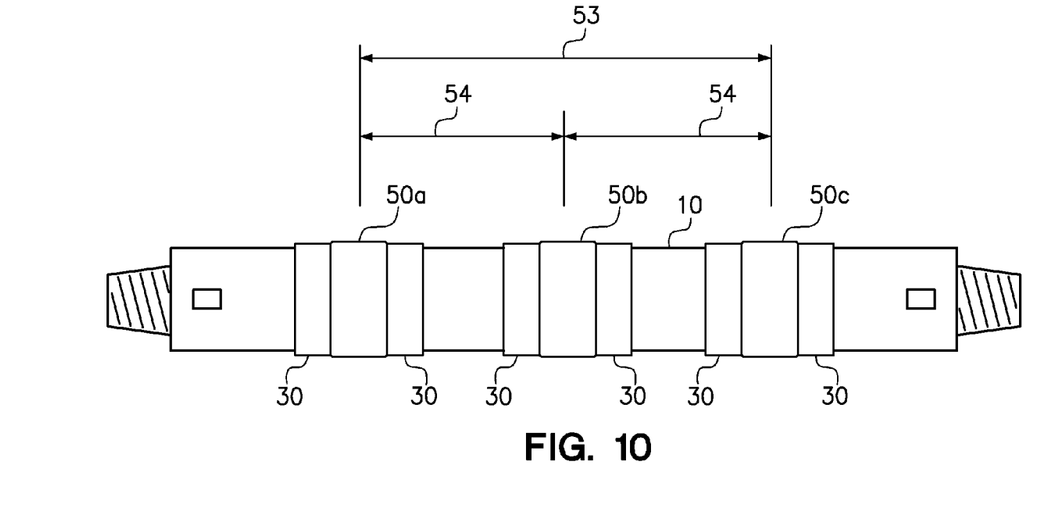
FIG. 10 is the elevation view of the sub of FIG. 9 after the second well logging device is repositioned and a third well logging device is secured on the sub. The reconfiguration of the well logging apparatus and system of FIG. 9 illustrated in FIG. 10 provides the first spacing (illustrated in FIG. 9) between the first well logging device and the third well logging device, and to provide a second spacing between the first well logging device and the second well logging device and also between the second well logging device and the third well logging device.

FIG. 10 is the elevation view of the sub 10 of FIG. 9 after the second well logging device 50b is repositioned and a third well logging device 50c is secured on the sub 10. The reconfigured well logging assembly and system of FIG. 9 illustrated in FIG. 10 provides a first spacing 53 (illustrated in FIG. 9) between the first well logging device 50a and the third well logging device 50c, and provides a second spacing 54 between the first well logging device 50a and the second well logging device 50b and also between the second well logging device 50b and the third well logging device 50c. The combination of the first spacing 53 between the first well logging device 50a and the third well logging device 50c, and the second spacing 54 between the first well logging device 50a and the second well logging device 50b and also between the second well logging device 50b and the third well logging device 50c, provides for a more thorough range of investigation depth and distance into a geologic formation surrounding an earthen bore drilled using a drill string including the sub 10 as dressed with well logging devices 50a, 50b and 50c as illustrated in FIG. 10.

In one embodiment of the apparatus and system of the present invention, the recesses 15 in the exterior wall 11 of the sub 10 are shaped to receive an insert 20 in a first orientation to position the threaded exterior 22 of the insert 20 (see FIGS. 2 and 3) to provide right-handed threads 25 to engage a retainer ring 30 received over the leading end connection 16 at the leading end 13 of the sub 10 or in a second orientation, 180 degrees out of phase with the first orientation, to provide right-handed threads for engagement by a retainer ring 30 received over the trailing end connection 16 at the trailing end 18 of the sub 10 (see FIG. 1). It will be understood that the shape of the recesses 15 in the exterior wall 12 of the sub 10 and the corresponding shape of the inserts 20 can provide for reversal of the thread direction to enable the securing of well logging devices 50 intermediate any two sets 26 of recesses 15 on the sub 10 because any set 26 of recesses 15 can be used, by selection of the thread orientation, to secure a first end or a second end of a well logging device 50.

In one embodiment of the apparatus and system of the present invention, a well logging device 50 securable to the sub 10 is of a length along the axis 11 of the sub 10 generally corresponding to the distance along the axis 11 of the sub 10 from a set 26 of recesses 15 to an adjacent set 26 of recesses 15, as illustrated in FIGS. 9 and 10. In another embodiment of the apparatus and system of the present invention, a well logging device 50 securable to the sub 10 is of a length along the axis 11 of the sub 10 corresponding to an integer multiple of the distance along the axis 11 of the sub 10 from a set 26 of recesses 15 to an adjacent set 26 of recesses 15 plus the integer multiple less one of the length of a recess 15. For example, but not by way of limitation, a well logging device 50 that is equal to two times the distance from a recess 15 to an adjacent recess 15 plus one times the length of a recess 15 can be secured on the sub 10 to surround and cover a set 26 of recesses 15 on the sub 10 with a first end 51 proximal to a set 26 of recesses 15 to the left of the surrounded and covered set 26 of recesses 15 and with a second end 52 proximal to a set 26 of recesses 15 to the right of the surrounded and covered set 26 of recesses 15 so that a first retainer ring 30 disposed on inserts 30 received in the set 26 of recesses 15 to the left of the surrounded and covered set 26 of recesses 15 can be torqued onto the threaded inserts 20 to secure the first end 51 of the well logging device 50 and a second retainer ring 30 received in the set 26 of recesses 15 to the right of the surrounded and covered set 26 of recesses 15 can be torqued onto the threaded inserts 20 to secure the second end 52 of the well logging device 50.

It will be understood that the recesses 15 and the inserts 20 may be of varying lengths, in a direction along the axis 11 of the sub 10, and of varying angular spans, in an angular direction about the axis 11 of the sub 10. For example, but not by way of limitation, an embodiment of a sub 10 having an external diameter of 12 inches may include recesses 15 within the exterior wall 12 of the sub 10 having a length, along the axis 11 of the sub 10, of four inches and an arc span of 20 degrees, about the axis 11 of the sub 10. In an embodiment of the sub 10 having two recesses 15 per set 26 of recesses 15, the circumference of the sub 10 within a plane perpendicular to the axis 11 and intersecting the set 26 of recesses 15 would include an arc span occupied by recesses 15 of 2 recesses per set x (20 degrees per recess÷360)×3.14×12 inches=4.19 inches of the total sub 10 circumference of 37.7 inches. It will be understood that increasing the arc span of the recesses 15 and inserts 20 will increase, for a given sub 10 diameter, the overall linear length of threads engaged by the retainer rings 30 that engage the threaded exterior 18 of the recesses 15. It will be further understood that increasing the number of inserts 20 per set 26 of inserts 20 will also increase the overall linear length of threads engaged by the retainer rings 30 that engage the threaded exterior 18 of the recesses 15.

Figure 11:
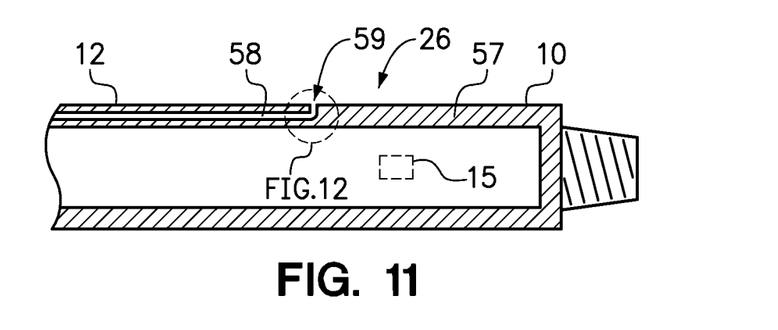
FIG. 11 is a sectional elevation view of a portion of the sub of FIG. 1 illustrating a passage within the sub to receive electrically conductive wires terminating at a first end at a well logging device (not shown) proximal to an aperture through which the passage is accessed.

FIG. 11 is a sectional elevation view of a portion of the sub 10 of FIG. 1 illustrating a passage 58 within the sub 10 to receive and protect electrically conductive wires (not shown) terminating at a first end at a well logging device (not shown) received onto the sub 10 proximal to an aperture 59 through which the passage 58 is accessed. The passage 58 is within a wall 57 of the sub 10, and the aperture 59 is positioned proximal to a recess 15 on the sub 10 for securing a well logging device 50 (not shown). It will be understood that electrically conductive wires (not shown) terminating at a first end at a well logging device 50 (not shown) may be received through the aperture 59 and the passage 58 and connected to a battery (not shown) or processor (not shown) connected to the sub 10.

Figure 12:
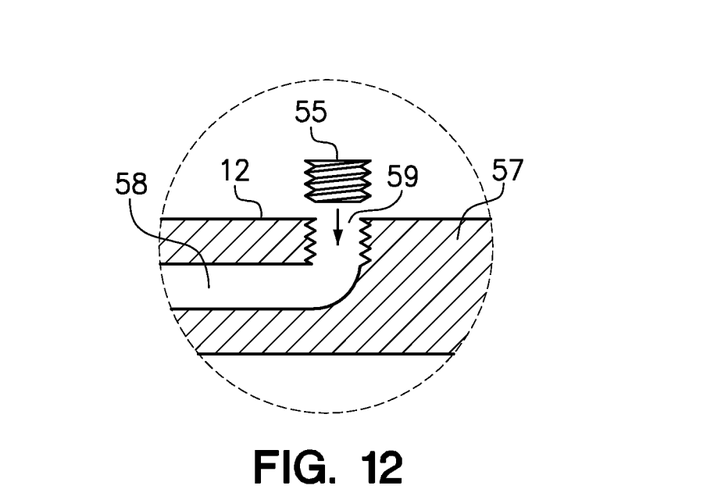
FIG. 12 is an enlarged view of a portion of the passage of the sub of FIG. 11.

FIG. 12 is an enlarged view of a portion of the passage 58 of the sub 10 of FIG. 11 with a threaded plug 55 positioned above the aperture 59 in the wall 57 of the sub 10. The plug 55 may be used to close the aperture 59 when it is not in use. For example, if a well logging device 50 (not shown) is not secured to the sub 10 at the recess 15 (not shown—see FIG. 11) adjacent to the aperture 59, the plug 55 may be threadably engaged with the aperture 59 to close the aperture 59 and the passage 58.

It will be understood that the dimensions of an embodiment of an exemplary sub 10 stated herein are for purposes of illustration and discussion only, and should not be considered as limiting of the scope of the present invention. A sub 10 used in an apparatus and system of the present invention may be 30 feet or more in length so provide a very wide range of obtainable spacings between well logging instruments 50. Additional spacing, when needed, can be achieved through the deployment of two modular sub-systems, each 30 feet long, spaced apart one from the other using one or more spacers.

The term "well logging device," as that term is used herein, includes, but is not limited to, a transmitter, a receiver, a transceiver, an antenna, or an electrode, and is not limited to electromagnetic measurement. A well logging device can also be a transducer for acoustic measurement or detector or nuclear source for nuclear measurements. A transceiver is a well logging device that can function as either a receiver or a transmitter, depending on the mode of operation. Embodiments of the sub 10 may further comprise apertures and/or channels within the sub 10 to accommodate electrically conductive wire to, for example, provide a current to a transceiver or other well logging device or electronic component within a well logging device. A conductive wire may be used to carry an electronic signal from a well logging device to another well logging device or to a processor, relay, data storage device, amplifier, etc. In some embodiments, apertures through the wall of the sub 10 may be threaded to accommodate closure of the aperture (while not in use) using a threaded plug.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
an elongate sub with a first end connection, a second end connection, a bore, an exterior wall and a plurality of sets of recesses in the exterior wall and spaced along an axis of the sub, each recess of a set angularly distributed about the axis relative to one or more remaining recesses of the set;
a plurality of curved inserts receivable into the recesses and having an interior surface, generally conforming to the exterior of the sub within a recess, and a threaded exterior surface;
a plurality of well logging devices each having a first end, a second end and a bore to receive the sub; and
a plurality of retainer rings each having a bore with internal threads to threadably engage the threaded exterior surfaces of a set of inserts received into a set of recesses;
wherein a first set of inserts are receivable into a first set of recesses of the sub to threadably engage the bore of a first retainer ring to secure a first end of a first well logging device received on the sub at a first position;
wherein a second set of inserts are receivable into a second set of recesses of the sub to threadably engage the bore of a second retainer ring to secure the second end of the first well logging device;
wherein a third set of inserts are receivable into a third set of recesses of the sub to threadably engage the bore of a third retainer ring to secure the first end of a second well logging device;
wherein a fourth set of inserts are receivable into a fourth set of recesses of the sub to threadably engage the bore of a fourth retainer ring to secure the second end of the second well logging device at a first spacing along the sub from the first well logging device; and
wherein at least a fifth set of the recesses of the sub remains available for repositioning of the second well logging device to provide a second spacing between the second well logging device and the first well logging device that is different than the first spacing.

2. The system of claim 1, wherein the first well logging device and the second well logging device comprise a first transceiver and a second transceiver.

3. The system of claim 1, wherein the first well logging device and the second well logging device comprise at least one of a transceiver, a transmitter, a receiver, and an electrode.

4. The system of claim 1, further comprising a passage within the sub to receive electrically conductive wires connected to one or more well logging instruments secured to the exterior wall of the sub.

5. The system of claim 4, further comprising an electrical power source to provide electrical current to at least one of the first and second well logging devices.

6. The system of claim 5, further comprising a compartment within the sub to receive the electrical power source.

7. The system of claim 5, wherein the electrical power source comprises at least one of a battery and a fuel cell.

8. The system of claim 5, further comprising a processor to receive signals from at least one of the first and second well logging devices.

9. The system of claim 8, further comprising a compartment within the sub to receive the processor.

10. The system of claim 1, wherein a fifth set of inserts are receivable into the fifth set of recesses to threadably engage the bore of a fifth retainer ring to secure a first end of a third well logging device on the sub at a third position that is at a spacing from the well logging device secured at the first position.

11. The system of claim 10, wherein a sixth set of inserts are receivable into a sixth set of recesses to threadably engage a sixth retainer ring to secure a second end of the third well logging device.

12. The system of claim 1, wherein each of the plurality of inserts is receivable in a first orientation within a recess to provide right-handed threads to threadably engage an internally-threaded portion of a retainer ring introduced onto the sub over a first end connection at a first end of the sub;
   wherein each of the plurality of inserts is receivable in a second orientation within the recess to provide right-handed threads to threadably engage an internally-threaded portion of a retainer ring introduced onto the sub over a second end connection at a second end of the sub; and
   wherein the second orientation in which an insert is receivable within a recess is 180 degrees out of phase with the first orientation in which an insert is receivable within the recess.

13. The system of claim 4, further comprising an aperture in the exterior wall of the sub providing access to the passage;
   wherein the electrically conductive wires received in the passage terminate at a first end at a well logging instrument secured to the sub proximal to the aperture.

14. The well logging system of claim 1, further comprising:
   a fifth set of recesses to receive inserts to engage a retainer ring to secure the first end of the second transceiver at a third position that is at a second spacing from the first position; and
   a sixth set of recesses to receive inserts to engage a retainer ring to secure the second end of the second transceiver.

15. The well logging system of claim 1, further comprising:
   a fifth set of recesses to receive inserts to engage a retainer ring to secure the first end of a third transceiver at a third position that is at the first spacing from the closest of the first position and the second position.

16. A method of using a well logging tool, comprising:
   providing a sub having a first end, a second end, and a plurality of sets of recesses in an exterior wall of the sub;
   receiving a bore of a first well logging device onto the sub;
   securing the first well logging device intermediate a first set and a second set of recesses;
   receiving a bore of a second well logging device onto the sub;
   securing the second well logging device intermediate a third set and a fourth set of recesses to provide a first spacing between the first well logging device and the second well logging device;
   making up the sub with the well logging devices secured in the first spacing into a drill string;
   running the drill string into an earthen bore;
   investigating a geologic formation of interest using the well logging devices spaced apart on the sub at the first spacing;
   retrieving the sub with the well logging devices from the earthen bore;
   releasing the second well logging device from the position intermediate the third and fourth sets of recesses;
   repositioning the second well logging device on the sub;
   securing the second well logging device intermediate a fifth set of recesses and at least one of a sixth set of recesses, the third set of recesses and the fourth set of recesses to provide a second spacing between the first well logging device and the second well logging device that is different than the first spacing;
   making up the sub with the well logging devices secured in the second spacing into a drill string;
   running the drill string into an earthen bore; and
   investigating a geologic formation of interest using the well logging devices spaced apart on the sub at the second spacing.

17. The method of claim 16 wherein securing the second well logging device intermediate a fifth set of recesses and at least one of a sixth set of recesses, the third set of recesses and the fourth set of recesses to provide a second spacing between the first well logging device and the second well logging device that is different from the first spacing comprises:
   securing the second well logging device intermediate a fifth set of recesses and a sixth set of recesses to provide a second spacing between the first well logging device and a second well logging device that is different from the first spacing; and
   wherein the fifth and sixth sets of recesses are disposed intermediate the first and second sets of recesses together proximal the first end of the sub and the third and fourth sets of recesses together proximal the second end of the sub.

18. A method of using a well logging tool, comprising:
   providing a sub having a first end, a second end, and a plurality of sets of recesses in an exterior wall of the sub;
   receiving a bore of a first well logging device onto the sub;
   securing the first well logging device intermediate a first set and a second set of recesses;
   receiving a bore of a second well logging device onto the sub;
   securing the second well logging device intermediate a third set and a fourth set of recesses to provide a first spacing between the first well logging device and the second well logging device;
   making up the sub with the well logging devices secured in the first spacing into a drill string;
   running the drill string into an earthen bore;
   investigating a geologic formation of interest using the well logging devices spaced apart on the sub at the first spacing;
   retrieving the sub with the well logging devices from the earthen bore;
   releasing the second well logging device from the position intermediate the third and fourth sets of recesses;
   repositioning the second well logging device on the sub;
   securing the second well logging device intermediate a fifth set of recesses and at least one of a sixth set of recesses, the third set of recesses and the fourth set of recesses to provide a second spacing between the first well logging device and the second well logging device that is different than the first spacing;
   making up the sub with the well logging devices secured in the second spacing into a drill string;
   running the drill string into an earthen bore; and
   investigating a geologic formation of interest using the well logging devices spaced apart on the sub at the second spacing.

* * * * *